United States Patent [19]

Hirono

[11] Patent Number: 5,606,658
[45] Date of Patent: Feb. 25, 1997

[54] TEXT PROCESSING DEVICE FOR PRINTING CHARACTER STRINGS IN VARIOUS CHARACTER STRING SHAPES

[75] Inventor: Kazuhisa Hirono, Nagoya, Japan

[73] Assignee: Brother Kogyo Kabushiki Kaisha, Nagoya, Japan

[21] Appl. No.: 261,103

[22] Filed: Jun. 16, 1994

[30] Foreign Application Priority Data

Jun. 16, 1993 [JP] Japan ................................ 5-169583

[51] Int. Cl.⁶ ................................................. G06T 3/40
[52] U.S. Cl. ........................... 395/171; 345/128; 345/144; 345/194
[58] Field of Search ........................... 395/151, 139, 395/141, 142, 143, 150, 155, 161, 144, 171; 345/26, 127–131, 141–144, 192–195; 400/578, 613

[56] References Cited

U.S. PATENT DOCUMENTS

| | | | |
|---|---|---|---|
| 4,939,674 | 6/1990 | Price et al. ............................... | 395/109 |
| 5,212,477 | 5/1993 | Indekeu et al. ..................... | 340/825.44 |
| 5,413,420 | 5/1995 | Ishida et al. .............................. | 400/61 |
| 5,448,685 | 9/1995 | Ogura et al. ............................. | 395/117 |
| 5,539,868 | 7/1996 | Hosoya et al. ........................... | 395/171 |

FOREIGN PATENT DOCUMENTS

| | | |
|---|---|---|
| 1-85050 | 6/1989 | Japan . |
| 2120821 | 12/1983 | United Kingdom . |

OTHER PUBLICATIONS

Feldman, Saul D., "The Print Shop Deluxe: banners, signs and more", *PC Sources*, Nov. 1992, v3 n11, p. 65.

Antonoff, Michael, "The Print Shop Deluxe is a hit for font and graphics lovers", *PC–Computing*, Jan. 1993, v6 n1, p. 72.

*The Print Shop Deluxe CD Ensemble Quick Start Guide*, Borderbund Inc., 1995, pp. 1–22.

*The Print Shop Deluxe Companion Graphics Reference Booklet*, Borderbund Inc., 1993, pp. 2–4.

Abstract of JP–A–04 148966, *Patent Abstracts of Japan*, vol. 16, No. 434, May 21, 1992.

Abstract of JP–A–04 029861, *Patent Abstracts of Japan*, vol. 16, No. 203, Jan. 31, 1992.

Abstract of JP–A–62 158072, *Patent Abstracts of Japan*, vol. 11, No. 392. Jul. 14, 1987.

Abstract of JP–A–05 108051, *Patent Abstracts of Japan*, vol. 17, No. 464, Apr. 30, 1993.

"Method for Defining and Manipulating Mixed Sized Geometric Text Strings on an All–Points–Addressable Device", *IBM Technical Disclosure Bulletin*, vol. 31, No. 1, pp. 333–334, Jun. 1988.

*Primary Examiner*—Joseph H. Feild
*Attorney, Agent, or Firm*—Oliff & Berridge

[57] ABSTRACT

A tape printer capable of simply printing character strings of inputted text in a variety of text row shapes, wherein, when a character string ABCD is developed into a dot pattern data according to a pattern number 1, first the lower edge of the character pattern for character A is aligned with the alignment standard position KP1 (baseline) and arranged in the print buffer. Then the character sizes of the characters B, C, and D are each increased compared to a respective previous character by the size change amount calculated in the size change amount calculation process control. With each increase, the lower edges of the character pattern is aligned with the alignment standard position KP1 and the resultant character patterns are arranged in order in the print buffer. The character string is printed in a character string shape based on the dot pattern data developed in the print buffer so that character sizes of characters in the character string ABCD gradually increase.

5 Claims, 13 Drawing Sheets

| PATTERN COUNT VALUE | KD1 | KD2 | KD3 | KD4 | CHARACTER STRING SHAPE |
|---|---|---|---|---|---|
| 1 | 0 | 0 | 0 | 0 | |
| 2 | 0 | 0 | 2 | 0 | |
| 3 | 1 | 0 | 0 | 1 | |
| 4 | 1 | 1 | 2 | 1 | |
| 5 | 1 | 0 | 1 | 1 | |

KD1 : CHANGE POINT DETERMINATION DATA
KD2 : INCREASE/DECREASE DESIGNATION DATA
KD3 : ALIGNMENT POSITION DATA
KD4 : FORMULA NUMBER DATA

FIG. 4

| PATTERN COUNT VALUE | KD1 | KD2 | KD3 | KD4 | CHARACTER STRING SHAPE |
|---|---|---|---|---|---|
| 1 | 0 | 0 | 0 | 0 | |
| 2 | 0 | 0 | 2 | 0 | |
| 3 | 1 | 0 | 0 | 1 | |
| 4 | 1 | 1 | 2 | 1 | |
| 5 | 1 | 0 | 1 | 1 | |

KD1 : CHANGE POINT DETERMINATION DATA
KD2 : INCREASE/DECREASE DESIGNATION DATA
KD3 : ALIGNMENT POSITION DATA
KD4 : FORMULA NUMBER DATA

FIG. 5

| MINIMUM SIZE COUNT VALUE (SC) | MINIMUM CHARACTER SIZE (SS) |
|---|---|
| 0 | 5pt |
| 1 | 6pt |
| 2 | 7pt |
| 3 | 8pt |
| 4 | 9pt |
| ... | ... |
| 24 | 29pt |
| 25 | 30pt |

FIG. 6

| MAXIMUM SIZE COUNT VALUE (LC) | MAXIMUM CHARACTER SIZE (LS) |
|---|---|
| 0 | 20pt |
| 1 | 21pt |
| 2 | 22pt |
| 3 | 23pt |
| 4 | 24pt |
| ... | ... |
| 29 | 49pt |
| 30 | 50pt |

TEXT PROCESSING DEVICE FOR PRINTING CHARACTER STRINGS IN VARIOUS CHARACTER STRING SHAPES

BACKGROUND OF THE INVENTION

1. Field of the Invention

The present invention relates to a text processing device, and more particularly to a text processing device for printing character strings of inputted text in various character string shapes such as diamond or trapezoidal shapes.

2. Description of the Prior Art

Conventionally, a text processing device such as a word processor for various languages basically includes a display for displaying several rows of text data, a keyboard, a printing device, and the like. The conventional text processing device prints text data for inputted text, symbols, and the like at a designated character size, space value, and character pitch on a print sheet with each row arranged to a standard position.

Japanese Utility Model Laid-Open Publication No. HEI-1-85050 discloses a tape printer with a text processing function. The tape printer can print inputted text data on tapes (for example, with widths of 10 or 24 mm) as a print medium at designated character sizes, character pitches, and the like. Various enhancements or functions are added to this tape printer, including a function allowing changing the size of only specified characters or character strings of text data.

A user may want to print character strings, made from inputted characters, symbols and the like, in character string shapes, such as diamond or trapezoid shapes, made by gradually increasing or decreasing the size of characters in a string of characters.

To print a character string in a simple shape, such as a trapezoidal or parallelepiped shape where only the side portions are slanted, the size of characters in the character string can be gradually decreased or increased using the size change function. However, the size change data must be inputted every time a character or symbol is inputted so that data input becomes troublesome. Additionally, the sizes of individual characters are changed in rough amounts so that the overall character string can not be printed with a good shape.

Further, character strings cannot be printed with the baseline of character string being moved down to have rotated parallelepiped or trapezoidal shapes which have a slanted lower edge.

SUMMARY OF THE INVENTION

It is an objective of the present invention to provide a text processing device capable of simply printing character strings of inputted text in a variety of outline contour shapes.

As shown in the block diagram of FIG. 1, a text processing device according to the present invention includes an input means for inputting symbols and characters and various commands; a text data memory means for storing inputted text data; character generator for storing standard dot patterns and standard font data of symbols and characters; and a printing means for printing characters and symbols. The device of the present invention further includes a shape designation data memory means for setting beforehand a plurality of shape designation data for designating a character string shape of a plurality of character string shapes for each of a plurality of character strings made from a plurality of characters, symbols, and the like; a shape setting means for setting one character string shape designated in the shape designation data memory means for a character string in the text data and for setting a maximum character size and a minimum character size for the character string; a size determination means for retrieving, based on the set data set in the shape setting means, shape designation data for the designated character string shape from the shape designation data memory means and for determining the size of each character, symbol, and the like of the character string; and a dot pattern data development means for producing dot pattern data based on data of the character size determining by the size determination means, based on data on the character string retrieved from the character generator, and based on data of the character string in the text data for output to the print means.

In the text processing device according to the present invention, a plurality of shape designation data for designating a character string shape of a plurality of character string shapes for each of a plurality of character strings made from a plurality of characters, symbols, and the like is set beforehand in a shape designation data memory means. Therefore, one character string shape designated in the shape designation data memory means for a character string in the text data and a maximum character size and a minimum character size for the character string are set by a shape setting means. By this, a size determination means retrieves, based on the set data set in the shape setting means, shape designation data for the designated character string shape from the shape designation data memory means and determines the size of each character, symbol, and the like of the character string. Therefore, a dot pattern data development means produces dot pattern data based on data of the character size determining by the size determination means, based on data on the character string retrieved from the character generator, and based on data of the character string in the text data for output to the print means. As a result, a printing means receives dot pattern data from the dot pattern developing means and prints the character string of the text data in the set character string shape.

In this way, a plurality of shape designation data for designating a character string shape of a plurality of character string shapes for each of a plurality of character strings made from a plurality of characters, symbols, and the like is set beforehand. Therefore, by setting only the character string shape, maximum size character, and minimum size character, character strings of text data is developed into dot pattern data so as to form the set character string shape and the dot pattern data is printed. Therefore inputted text can be simply and attractively printed in a variety of character string shapes by the shape designation data.

BRIEF DESCRIPTION OF THE DRAWINGS

The above and other objects, features and advantages of the present invention will become more apparent from the following description when taken in conjunction with the accompanying drawings, in which:

FIG. 4 is a table showing setting content of a shape designation table;

FIG. 5 is a table showing minimum character size shown at a minimum size counter;

FIG. 6 is a table showing maximum character size shown at a maximum size counter;

DETAILED DESCRIPTION OF THE PREFERRED EMBODIMENTS

A description of a preferred embodiment of the present invention will be provided while referring to the accompanying drawings.

The present embodiment describes the present invention applied to a Japanese language tape printer capable of printing a variety of characters such as Chinese characters (kanji), Japanese syllabary (hiragana or katakana), alphabet characters, and symbols on a print tape.

Figure 1:
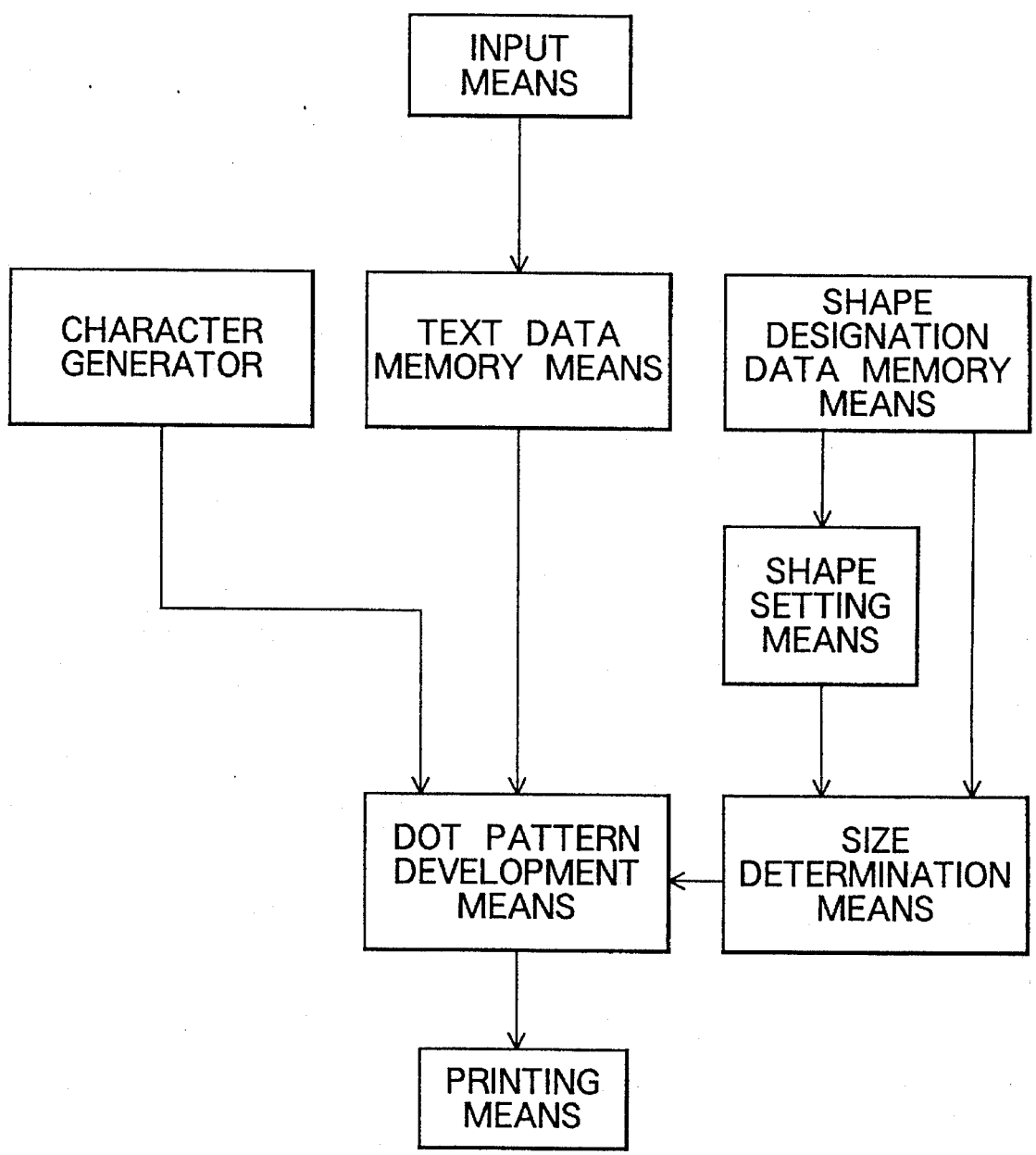
FIG. 1 is a functional block diagram indicating a structure according to the present invention.
Figure 2:
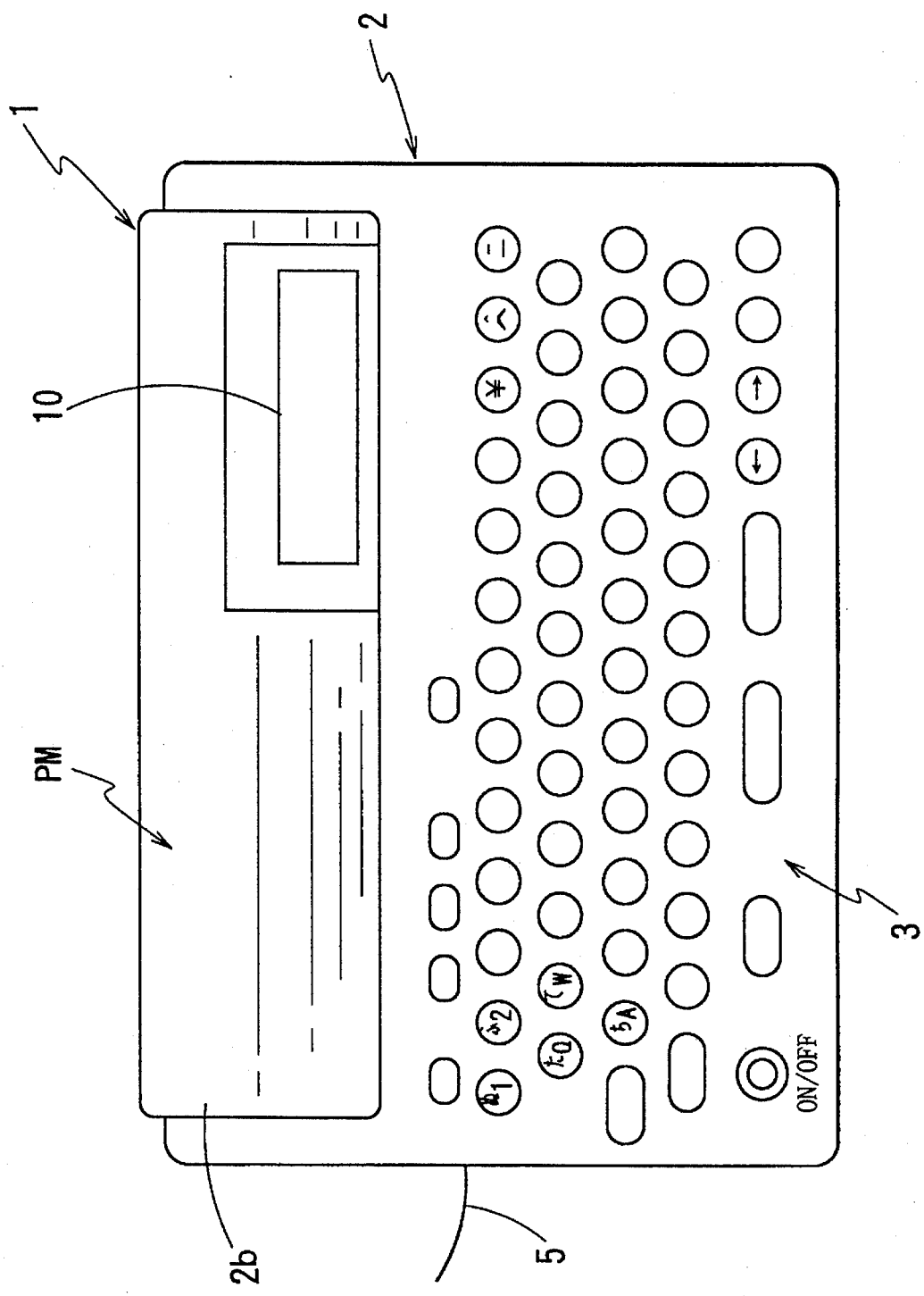
FIG. 2 is a planer view showing a tape printer.

As shown in FIG. 2, a keyboard 3 is positioned to the front portion of the frame 2 of the tape printer 1. A print mechanism PM is positioned to the center of the frame behind the keyboard 3. A liquid crystal display 10 capable of displaying six characters and/or symbols is provided to the curved frame portion 2b above the rear side of the key board 3.

The keyboard 3 is provided with a plurality of character keys for inputting alphanumerals, hiragana characters, symbols, and the like; cursor movement keys for scrolling the cursor left or right along the character string displayed on the display 10; a space bar; a non-conversion key; a conversion key; an input mode conversion key for selectively changing and setting an input mode from "Romanji," "Hiragana," or "alphabet;" a format set key for setting a printing format; a print mode key for displaying the print mode, i.e., normal print mode or specified length print mode; a mode conversion key for changing between various set modes; a print key for executing printing; a tape feed key for feeding a tape 5; a power source key for turning the power source ON and OFF; and the like.

Figure 3:
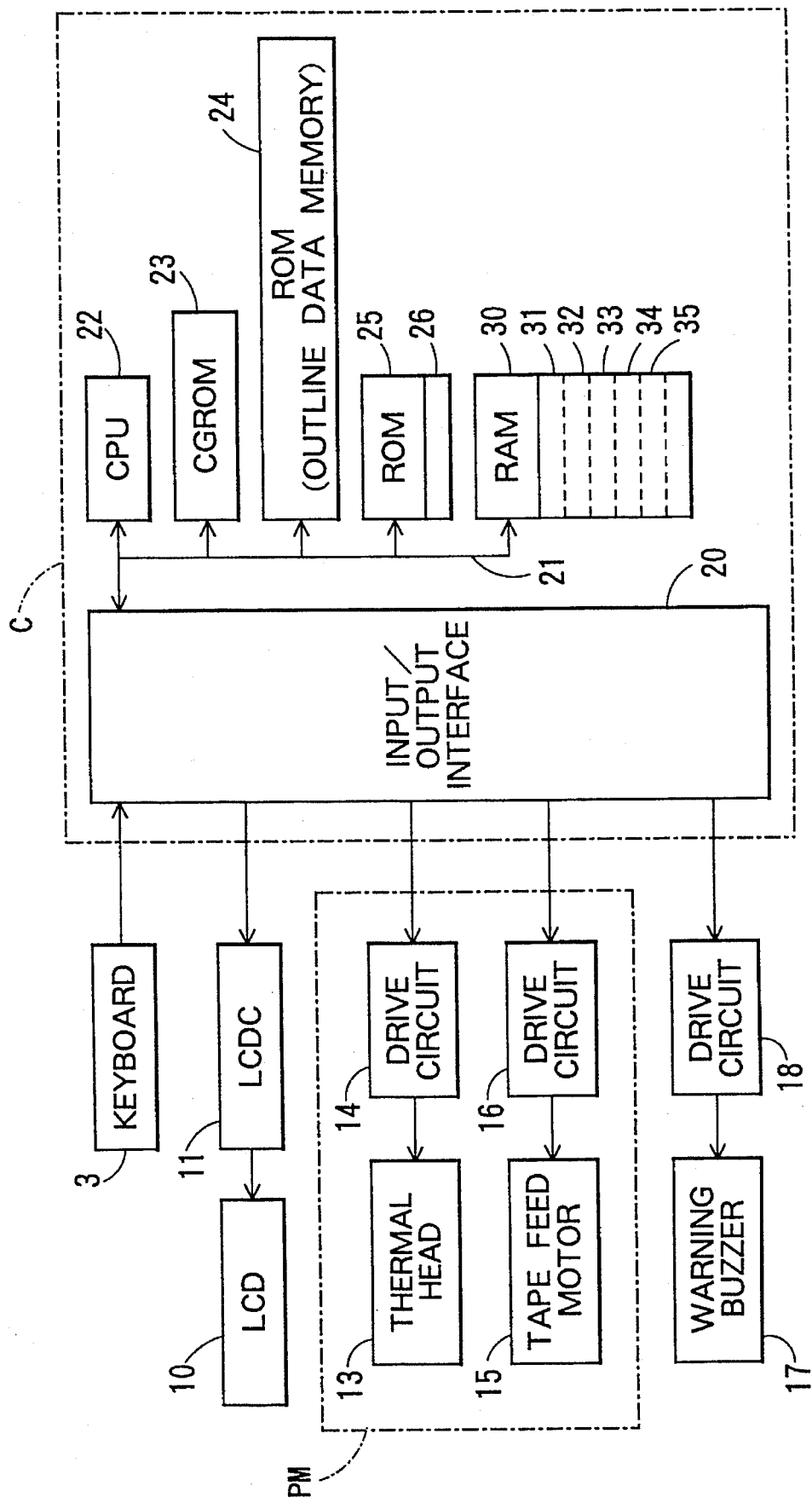
FIG. 3 is a block diagram of a control system of the tape printer.

Next, a brief description of the print mechanism PM will be provided while referring to FIG. 3. A thermal head 13 is provided in the print mechanism PM with a predetermined number of thermal elements aligned vertically thereto. A print tape 5 made from a transparent film into a predetermined width, for example, 12 mm, and an ink ribbon are supplied to the thermal head 13 while the thermal elements are energized. The tape, with a two-sided tape attached thereto, is discharged from the frame 2. The print tape 5, the ink ribbon, the two-sided tape, and other components are integrally housed in a parallelepiped tape accommodation cassette.

Next, description of the system for controlling the tape printer 1 will be provided while referring to the block diagram of FIG. 3.

An input/output interface 20 has connected thereto the keyboard 3, a liquid crystal display controller (LCDC) 11 having a display RAM for displaying output of display data on the liquid crystal display (LCD), a drive circuit 14 for driving the thermal head 13, a drive circuit 16 for driving a tape feed motor 15 for rotating a plurality of rollers and spools wound with the two-sided tape, ink ribbon, and print tape, a drive circuit 18 for a warning buzzer 17. A control device C includes a CPU 22, a CGROM 23, ROMs 24 and 25, a RAM 30, and an input/output interface 20, all connected via a bus 21 (which is, for example, a data bus).

For each of a variety of characters, the CGROM (pattern data memory) 23 stores dot pattern data, for the purpose of display, in correspondence with code data. The ROM (which is an outline data memory corresponding to the character generator) 24 stores outline data, for designating the outline of characters, categorized by font, for example, gothic, Ming-cho like times Roman fonts, and in correspondence with the code data.

The ROM 25 stores a display drive control program for controlling the display controller 11 according to code data of characters such as symbols, numbers and characters inputted through the keyboard 3; an image developing process control program for converting outline data, corresponding to each code data in the text memory 31, into printable dot patterns and developing the dot patterns in an image buffer 35; a print drive control program for retrieving data from the print buffer 35 in the order stored and driving the thermal head 13 and the tape feed motor 15; and a tape print control program (to be described later).

A set text memory 26 is provided in the ROM 25. The set text memory 26 stores a shape designation table KT and code data. As shown in FIG. 4, for designating one of five types of outline contour shape of a character string, the shape designation table KT includes various data for each of five count values (1 through 5) PC from a pattern counter for designating one of five types of contour shapes. The data in the shape designation table KT includes change point determination data KD1 for determining whether or not there exists a change point where increasing character size changes to decreasing character size or vice versa; increase/decrease designation data KD2 for designating an increase or a decrease in character size; alignment position data KD3 for designating an alignment position; and formula number data KD4 of formulas for determining the character size of each character in the character string. The code data includes minimum character size (5 pt to 30 pt) code data and maximum character size (20 to 50 pt) code data. As shown in FIG. 5, minimum character size code data is provided for each count value SC (0 through 25) of a minimum size counter for setting the minimum size SS of each pattern. As shown in FIG. 6, maximum character size code data (20 pt through 50 pt) is provided for each counter value (0 to 30) LC of a maximum size counter for designating a maximum character size LS of each pattern. The five types of character string shapes indicated by pattern values PC in the shape designation table KT are illustrations. The code SS in the character string shapes indicates the minimum character size and the code LS indicates the maximum character size.

Figure 12:
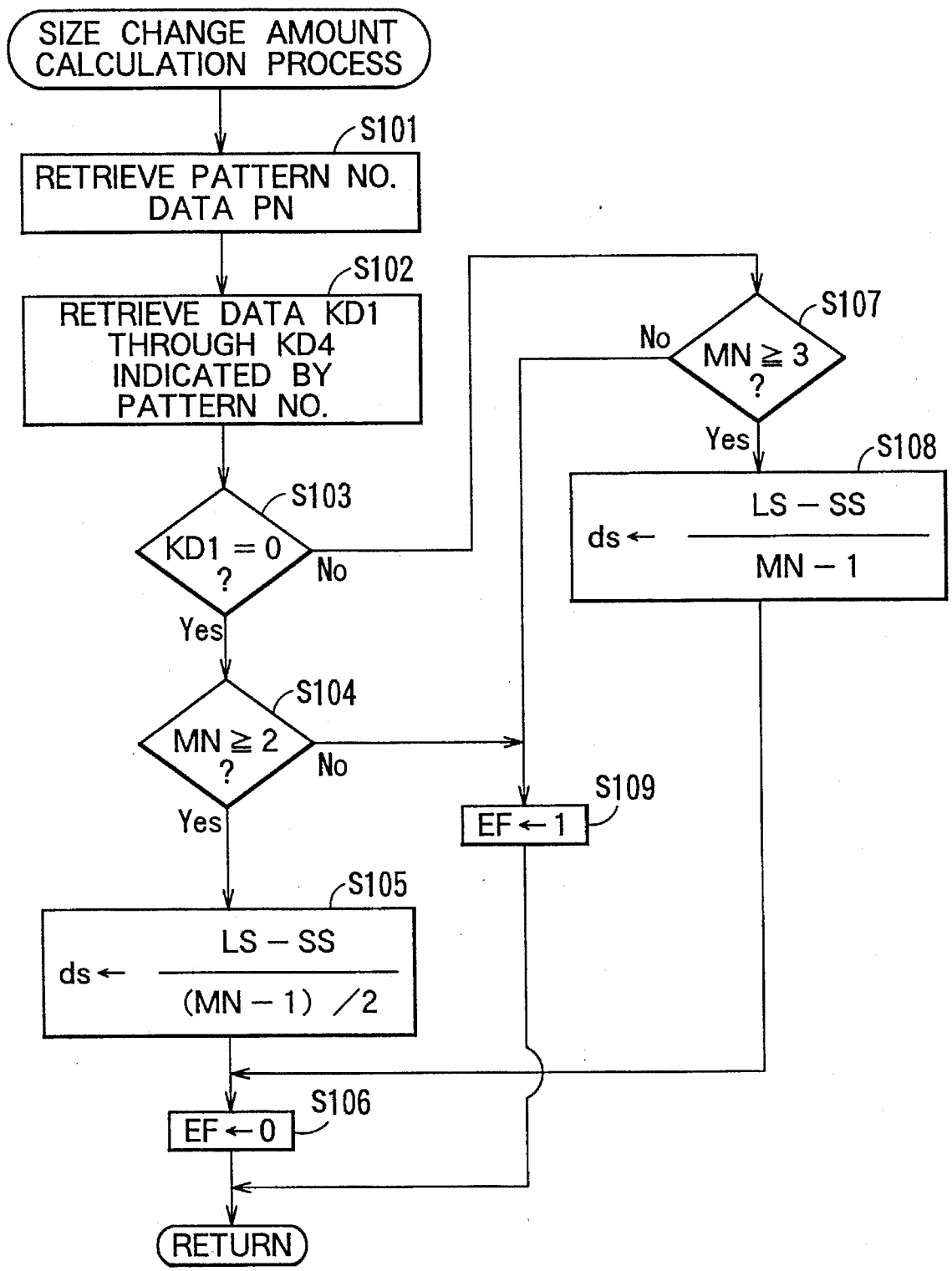
FIG. 12 is a flowchart schematically showing a routine for controlling size change amount calculation processes.
Figure 13:
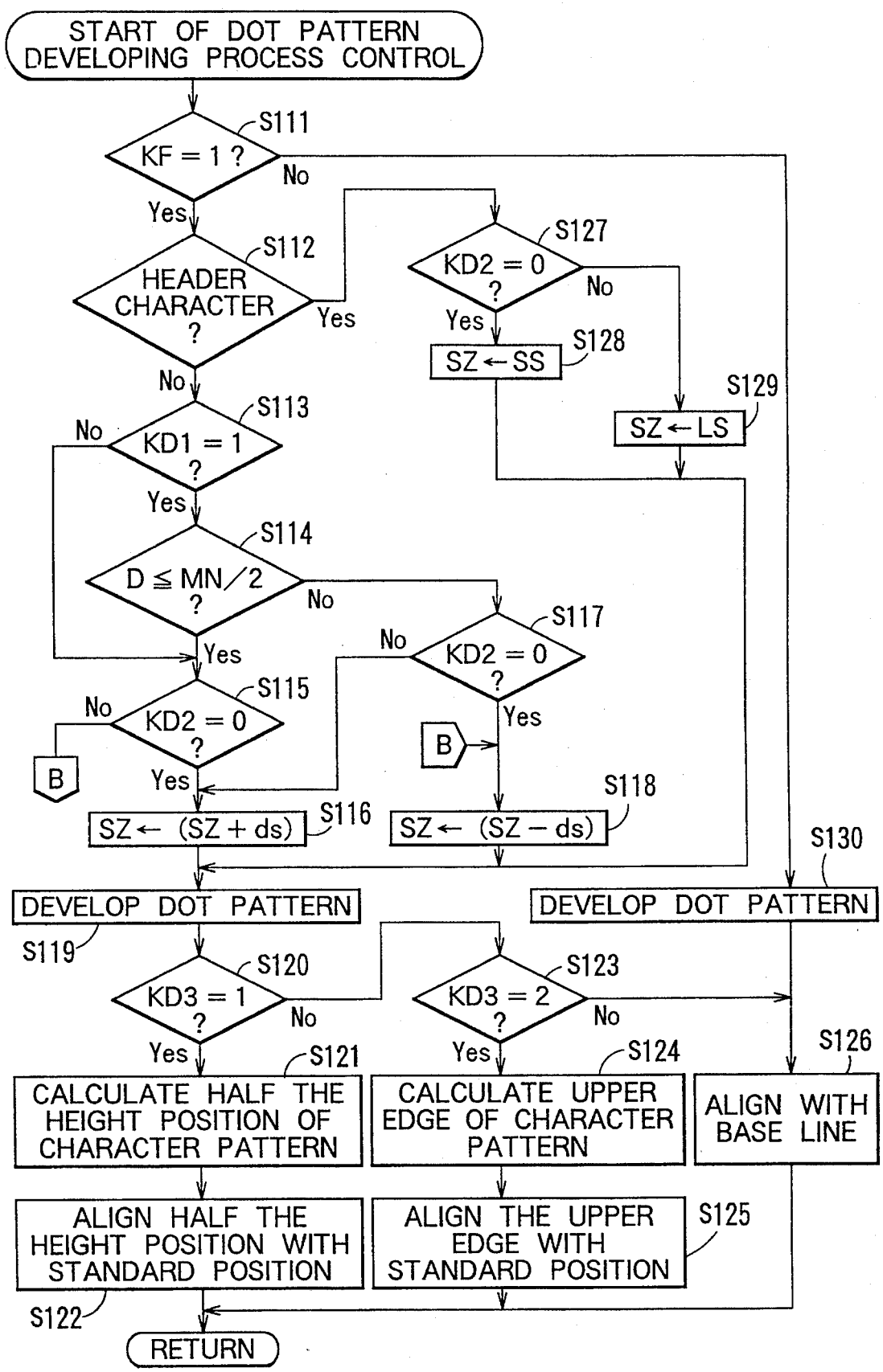
FIG. 13 is a flowchart schematically showing a routine for controlling processes for developing dot patterns.

When the change point determination data (KD1) in the shape designation table KT is 0, the size of characters in the character row either only gradually increase or decrease. When the change point determination data (KD1) is 1, a change point is present in the character string shape. When the increase/decrease designation data (KD2) is 0, there is an increase in the character size, and when 1, there is a decrease. When the alignment position data (KD3) is 0, the lower points of characters are aligned, when 1, the center of the height of characters are matched, and when 2, the upper points of characters are aligned. Further, when the formula number data (KD4) is 0, the formula in step 105 of the size change amount calculation control shown in FIG. 12 is used. This formula is for determining the amount of increase or decrease in size of each character in a character row when, as in pattern numbers 1 or 2, character sizes in a character string gradually increase or decrease. When the formula number data (KD4) is 1, the formula in step 105 of the size change amount calculation control shown in FIG. 12 is used. This formula is for determining the amount of increase or decrease in size of each character in a character row when, as in pattern numbers 3 to 5, character sizes in the front or back half of a character string gradually increase or decrease.

A text memory (which corresponds to the text data memory means) 31 is provided in the RAM 30. Code data of symbols, characters, and the like inputted from the keyboard 3 are stored as text data in the text memory 31.

A variety of print format information such as character size data, font data, and print direction (vertical or horizontal directions) set for printing normal characters is stored in the print format memory 32.

Flag data and pointer values TXP are stored in the flag/pointer memory 33. The pointer values TXP are from a text pointer for designating an address in the text memory 31. The flag data includes a text mode flag TMF for setting a mode for inputting and editing text data made from character strings; a normal print flag NPF for setting a normal print mode; a shape print flag for setting a shape print mode for printing character strings in a character string shape; a print mode change flag PCF for setting the normal print mode or the shape print mode when the print mode is switched from one of these to the other; a minimum size setting mode flag SSF for setting a mode for selecting the minimum character size SS when shape printing is performed; a maximum size setting mode flag LSF for setting the mode for selecting the maximum character size SS when shape printing is performed; a pattern setting mode flag PSF for setting the mode for selecting the pattern number of the character string shape; and an error flag EF.

When shape printing is performed, set minimum character size data SS, maximum character size data LS, pattern number data PN, and print character size shape data SZ, for when shape printing is performed, are stored in the pattern memory 34. The change point determination data KD1, the increase/decrease designation data KD2, the alignment position data KD3, and the formula number data KD4 read when shape printing is performed, and the determined size change amount data ds, are stored in the pattern memory 34. Further, when dot patterns of a plurality of characters, symbols, and the like are developed, standard alignment position data KP for setting the alignment position of the dot patterns is stored in the print buffer 35.

Dot pattern data for a plurality of image developed characters, symbols, and the like are stored in the print buffer 35. That is, a memory amount is provided in the print buffer 35 with a predetermined bit size sufficient for 50 characters in the horizontal direction and 128 bits (16 bytes) in the vertical direction.

Next, a description of the tape print control routine performed in the control device C of the tape printer 1 will be provided while referring to the flowcharts in FIGS. 7 through 13. The reference numerals Si (i=10, 11, 12, . . . ) in the diagrams refer to steps of the routine.

Figure 7:
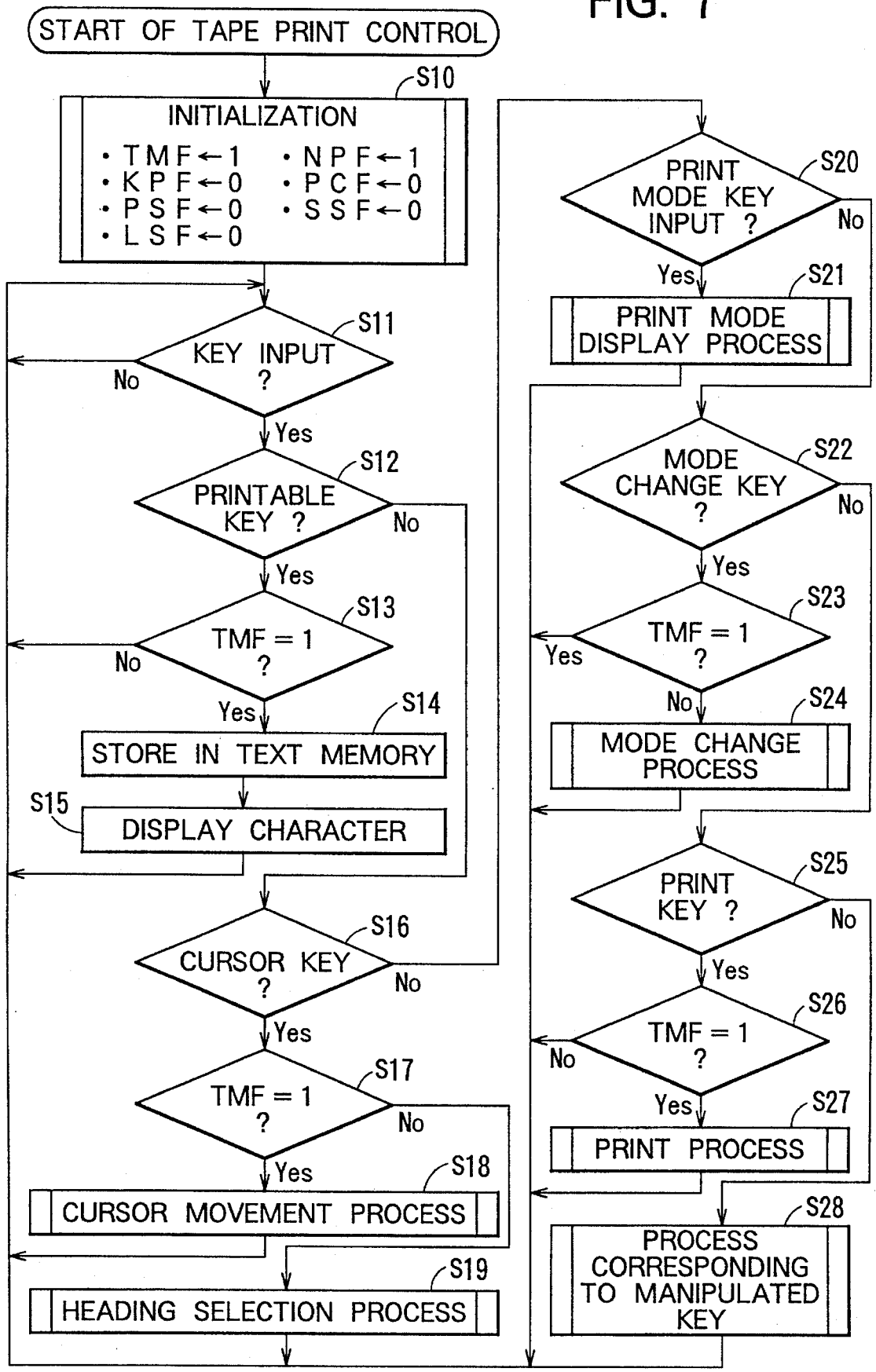
FIG. 7 is a flowchart schematically showing a routine for controlling printing of a tape.

When the power source is turned ON by operating the power source key, the tape print control shown in FIG. 7 is started and initialization is performed in step 10. In this initialization step 10, of the above-described mode flags, the text mode flag TMF and the normal print mode flag NPF are set (that is, the flag data is 1), and the shape print mode flag KPF, the print mode change flag PCF, the minimum size setting mode flag SSF, the maximum size setting mode flag LSF, and the pattern setting mode flag PSF are reset. Further the normal print data is stored in the header address of the text memory 31. That is, basically input of text is possible and initialization for normal printing of text is performed. However, when either the normal print mode flag NPF or the shape printing mode flag KPF is set, the other is reset.

Next, whether a key has been input is determined in step 11. If so (i.e. step 11 is "YES"), whether the manipulated key is a printable key such as for a character, symbol, or alphabetic character is determined in step 12. If so (i.e. step 12 is "YES"), whether the text mode flag TMF is set is determined in step 13. If so (i.e. step 13 is "YES"), that text code is stored in the text memory 31 in step 14 and that character is displayed on the display in step 15 and the routine returns to step 11. However, when the conversion key is manipulated after a string of hiragana are inputted, the code data for the Chinese character to which the string of hiragana is converted is stored in the text memory 31 in step 14 and the Chinese character is displayed on the display 10 in step 15. On the other hand, when the text input mode is not set (i.e., step 13 is "NO"), manipulation of printable keys is ignored and the routine returns to step 11.

Next, when a cursor movement key is manipulated (i.e., step 11 is "YES," step 12 is "NO," and step 16 is "YES"), whether the text mode flag is set to the text input mode (1) is determined in step 17. If so (i.e. step 17 is "YES"), cursor movement processes for moving the cursor right or left are executed in step 18.

Figure 8:
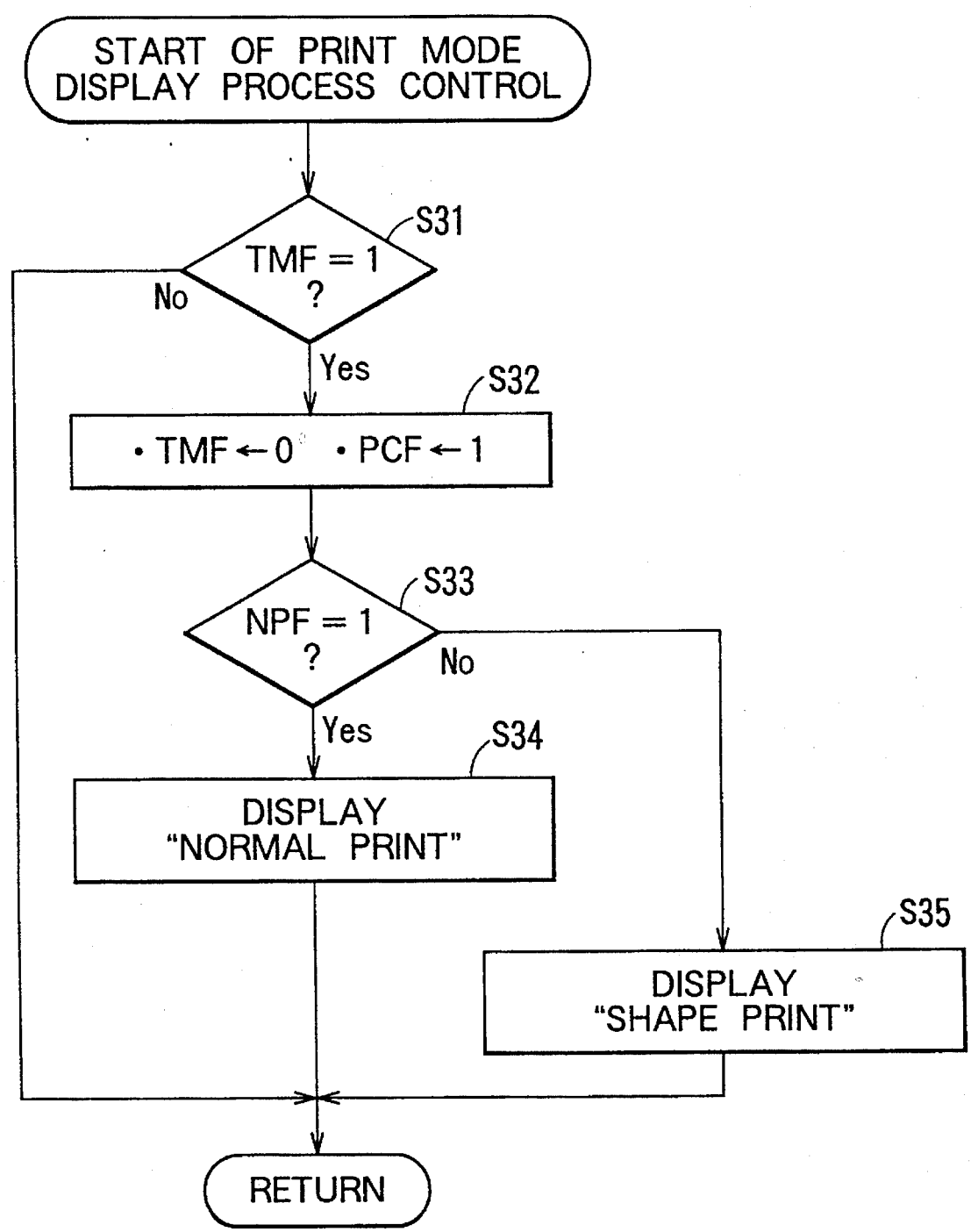
FIG. 8 is a flowchart schematically showing a routine for controlling processes for setting a print mode.

Next, when the print mode for confirming the present print mode is manipulated (i.e., step 11 is "YES," step 12 and step 16 are "NO," and step 20 is "YES"), the print mode display process control shown in FIG. 8 is executed in step 21.

When this control is started, whether the text mode flag TMF is set is determined in step 31. If so (i.e. step 31 is "YES"), the text mode flag TMF is reset and the print mode change flag PCF is set in step 32. Next, whether the normal print mode flag NPF is presently set is determined in step 33. If so (i.e. step 33 is "YES"), "Normal Print" is displayed on the display 10 in step 34, this control process is completed and the tape print control returns to step 11. However, when the normal print mode flag NPF is not set, that is, when the shape print mode flag KPF is set (i.e., step 33 is "NO"), "Shape Print" is displayed on the display 10 in step 35, this control is completed, and the routine returns to step 11 in the same manner as described above. For example, when only text is inputted after the power is turned ON, "Normal Print"

will be displayed. When this control is started, if the text mode flag TMF is not set (i.e., step 31 is "NO"), this control will be immediately terminated and the control will return to step 11 as described above.

Figure 10:
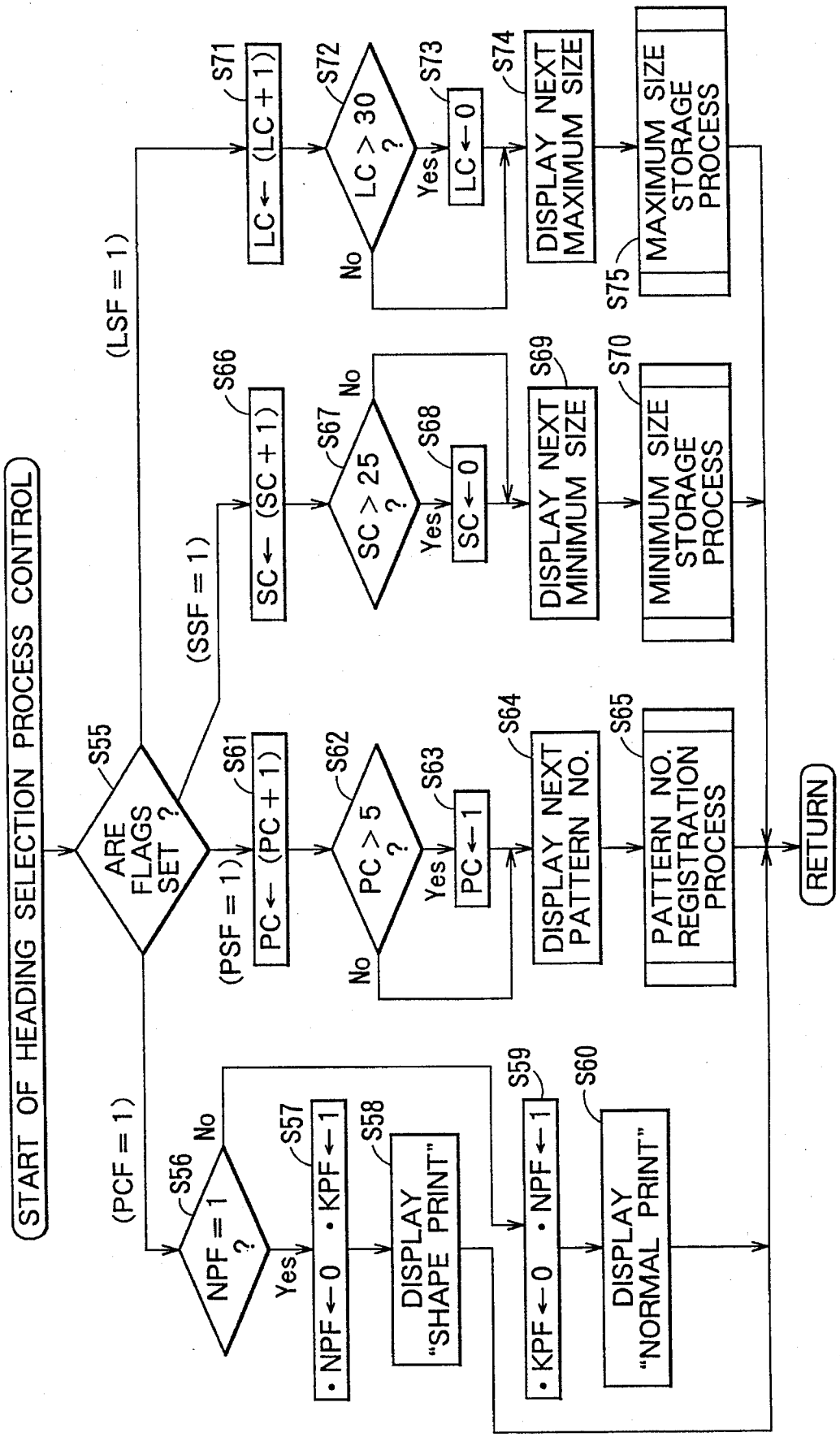
FIG. 10 is a flowchart schematically showing a routine for controlling processes for selecting a header.

When during tape print control a cursor movement key (either the cursor key for leftward or rightward movement) is manipulated when "Shape Print" is being displayed on the display 10 (i.e., step 11 is "YES," step 12 is "NO," and step 16 is "YES"), because the text mode flag TMF is set (i.e., step 17 is "NO"), heading selection process control shown in FIG. 10 is executed in step 19.

When this control process is started, first, whether the print mode change flag PCF, pattern set mode flag PSF, the minimum size setting mode flag LSF, or the maximum size setting mode flag SSF is set is determined in step 55. When the print mode change flag PCF is set (i.e., PCF=1) and the normal print mode flag NPF is set (i.e., step 56 is "YES"), the normal print mode flag NPF is reset and the shape print mode flag KPF is set in step 57, "Shape Print" is displayed on the display 10 in step 58, this control process is completed and the tape print control returns to step 11. When the print mode change flag PCF is set and the normal print mode flag NPF is reset (i.e., step 56 is "NO"), the shape print mode flag KPF is reset and the normal print mode flag NPF is set in step 59, "Normal Print" is displayed on the display 10 in step 60, this control is completed, and the routine returns to step 11.

Figure 9:
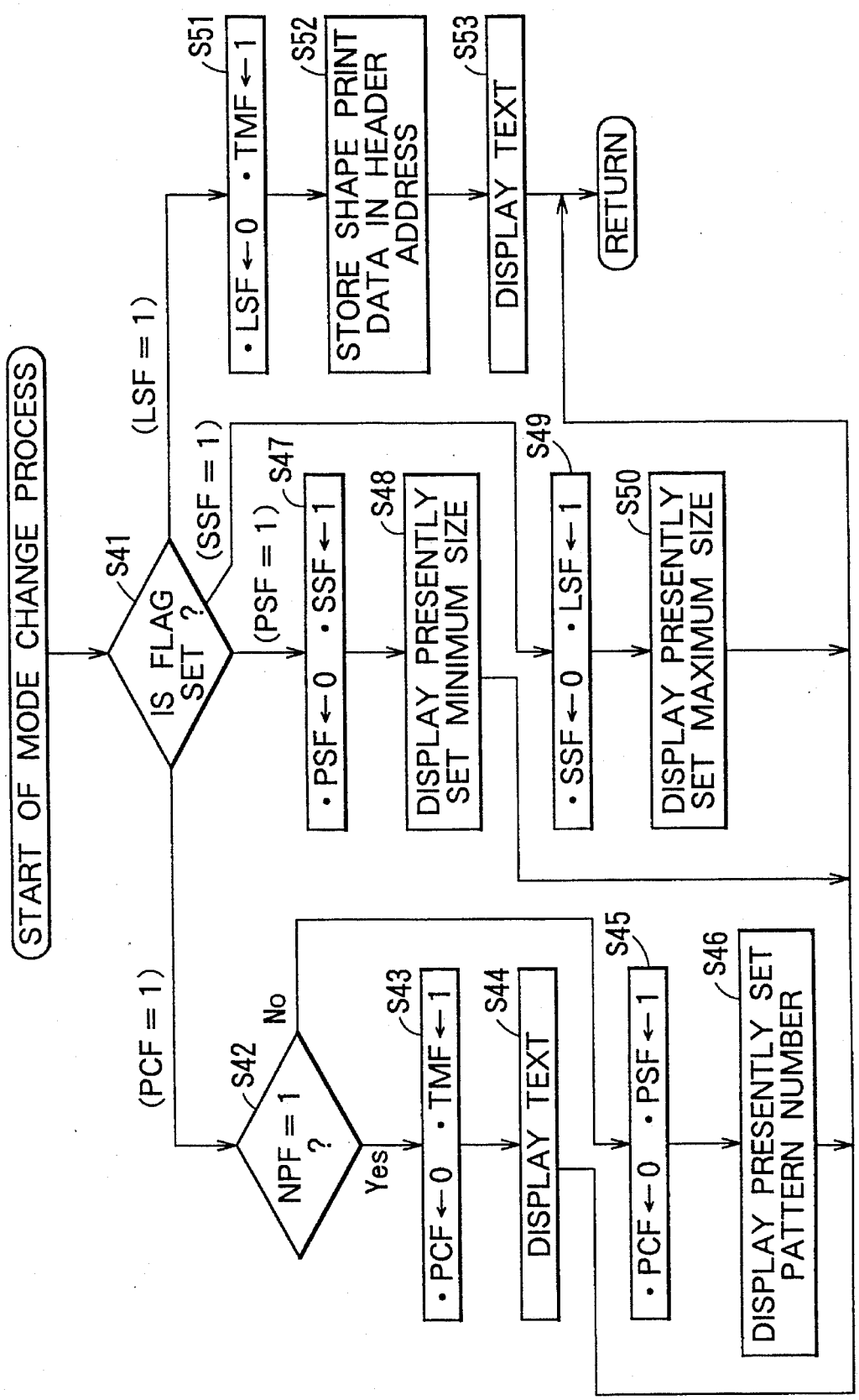
FIG. 9 is a flowchart schematically showing a routine for controlling mode change processes.

In the tape print control, when the mode conversion key is manipulated in order to select a maximum character size LS, a minimum character size SS, or a pattern number, which are necessary for shape printing (i.e., step 11 is "YES," step 12, step 16, step 20 are "NO," and step 22 is "YES"), if the text mode flag TMF is not set (i.e., step 23 is "NO"), the mode change process control shown in FIG. 9 is executed in step 24. However, when the text mode flag TMF is set (i.e., step 23 is "YES"), manipulation of the mode change key is ignored and the program returns to step 11.

When this control is started, whether the print mode change flag PCF, the pattern setting mode flag PSF, the minimum size setting mode flag SSF, or the maximum size setting mode flag LSF has been set is determined in step 41. When the print mode change flag PCF has been set (PCF=1), and the normal print mode flag NPF is set (i.e., step 42 is "YES"), the print mode change flag PCF is reset and the text mode flag TMF is set in step 43, the text data stored in the text memory 31 is displayed on the display 10 in step 44, and the routine returns to step 11.

However, when the normal print mode flag NPF is not set, that is, the shape print mode flag KPF is set (i.e., step 42 is "NO"), the print mode change flag PCF is reset and the pattern setting mode flag PSF is set in step 45, the pattern number presently set is displayed on the display 10 based on the pattern counter value PC in step 46, this control is completed, and the routine returns to step 11. For example, "PNo:1," "PNo:2," and the like are displayed on the display 10.

Here, in the tape print control, when the cursor movement key is manipulated, heading selection process control is executed in the same manner as in step 19.

When this control is started, when the pattern setting mode flag PSF is determined in step 55 as set (refer to step 45), the pattern counter value PC is incremented by 1 in step 61. When the count value PC is the maximum value of 5 or less (i.e., step 62 is "NO"), the next pattern number is displayed on the display 10 in step 64, pattern number registration processes are executed in step 65, this control is completed, and the routine returns to step 11. In the pattern number registration processes, when the return key is manipulated, the displayed pattern number data PN is stored in the parameter memory 34. However, the pattern number data PN will not be stored in the parameter memory 34 by manipulation of a key other than the return key. When the count value PC is greater than the maximum value 5 (i.e., step 62 is "YES"), the count value PC is set to 1 in step 63. After step 64 and step 65 are executed, the routine returns to step 11. For example, as shown in FIG. 4, when the counter value PC is changed from 1 to 2, "PNo:2" is displayed and when the count value PC is changed from 2 to 3, "PNo:3" is displayed. However, when the count value PC is changed from 5 to 6, 1 is set and "PNo:1" is displayed.

Next, in the tape print control, when the mode conversion key is manipulated, the mode change process control is executed in step 24 in the same manner as described previously.

When this control is started, because the pattern setting mode flag PSF is set (refer to step 45) as a result of the determination in step 41, the pattern setting mode flag PSF is reset and the minimum size setting mode flag SSF is set in step 47, the presently set minimum character size SS is displayed on the display 10 based on the minimum size count value SC in step 48, this control is completed, and the routine returns to step 11. For example, "5 pt," "8 pt," "10 pt," and so on are displayed on the display 10.

Here, in the tape print control, when a cursor movement key is manipulated, heading selection process control is executed in step 19 in the same manner as described previously.

When this control is started, as a result of the determination in step 55, the minimum size setting mode flag SSF is set (refer to step 47), the minimum size setting mode flag SSF is incremented in step 66. When the count value SC is the maximum value of 25 or less (i.e., step 67 is "NO"), the next minimum size SS is displayed on the display 10 in step 69, the minimum size storage process is executed in step 70, this control is completed, and the routine returns to step 11. In this minimum size storage process, when the return key is manipulated, the displayed minimum size data SS is stored in the parameter memory 34. However, the minimum size data SS will not be stored in the pattern memory 34 when any key other than the return key is manipulated. When the count value SC is greater than the maximum value of 25 (i.e., step 67 is "YES"), the count value is set to 0 in step 68 and the routine returns to step 11 after step 69 and step 70 are executed. For example, as shown in FIG. 5, when the count value SC is changed from 0 to 1, "6 pt" is displayed and when the count value SC is changed from 1 to 2, "7 pt" is displayed. However, when the count value SC is changed from 25 to 26, 0 is set and "5 pt" is displayed.

Next, in the tape print control, when the mode conversion key is manipulated, the mode change process control is executed in step 24 in the same manner as described previously.

When this control is started, when the minimum size setting mode flag SSF is determined as set in step 41 (refer to step 47), the minimum size setting mode flag SSF is reset and the maximum size setting mode flag LSF is set in step 49, the presently set maximum size setting mode flag LSF is displayed on the display 10 based on the maximum size counter value LC in step 50, this control is completed, and the routine returns to step 11. For example, "20 pt," "23 pt," "30 pt," and so on are displayed on the display 10.

Here, in the tape print control, when a cursor movement key is manipulated, heading selection process control is executed in step 19 in the same manner as described previously.

When this control is started, because the maximum size setting mode flag LSF is determined in step 55 as set (refer to step 49), the maximum size count value LC is incremented in step 71. When this count value LC is the maximum value of 30 or less (i.e., step 72 is "NO"), the next maximum size LS is displayed on the display 10 in step 74, maximum size storage processes are executed in step 75, this control is completed, and the routine returns to step 11. In the maximum size storage processes, when the return key is manipulated, the displayed maximum size data LS is stored in the parameter memory 34. However, the maximum size data LS will not be stored in the parameter memory 34 by manipulation by any key other than the return key. When the counter value LC is greater than the maximum value of 30 (i.e., step 72 is "YES"), the counter value LC is set to 0 in step 73, and the program returns to step 11 after step 74 and step 75 are executed. For example, as shown in FIG. 6, when the counter value LC is changed from 0 to 1, "21 pt" is displayed and when the counter value LC is changed from 1 to 2, "22 pt" is displayed. However, when the counter value LC is changed from 30 to 31, the counter value LC is set to 0 and "20 pt" is displayed.

Here, in the tape print control, when the mode conversion key is manipulate, mode change process control is executed in step 24 in the same manner as described previously.

When this control is started, when the maximum size setting mode flag LSF is determined as set in step 41, the maximum size setting mode flag LSF is reset and the text mode flag TMF is set in step 51, shape print data is stored in the header address of the text memory 31 in place of the normal print data in step 52, the text data stored in the text memory 31 is displayed on the display 10 in step 53, this control is completed, and the routine returns to step 11.

Figure 11:
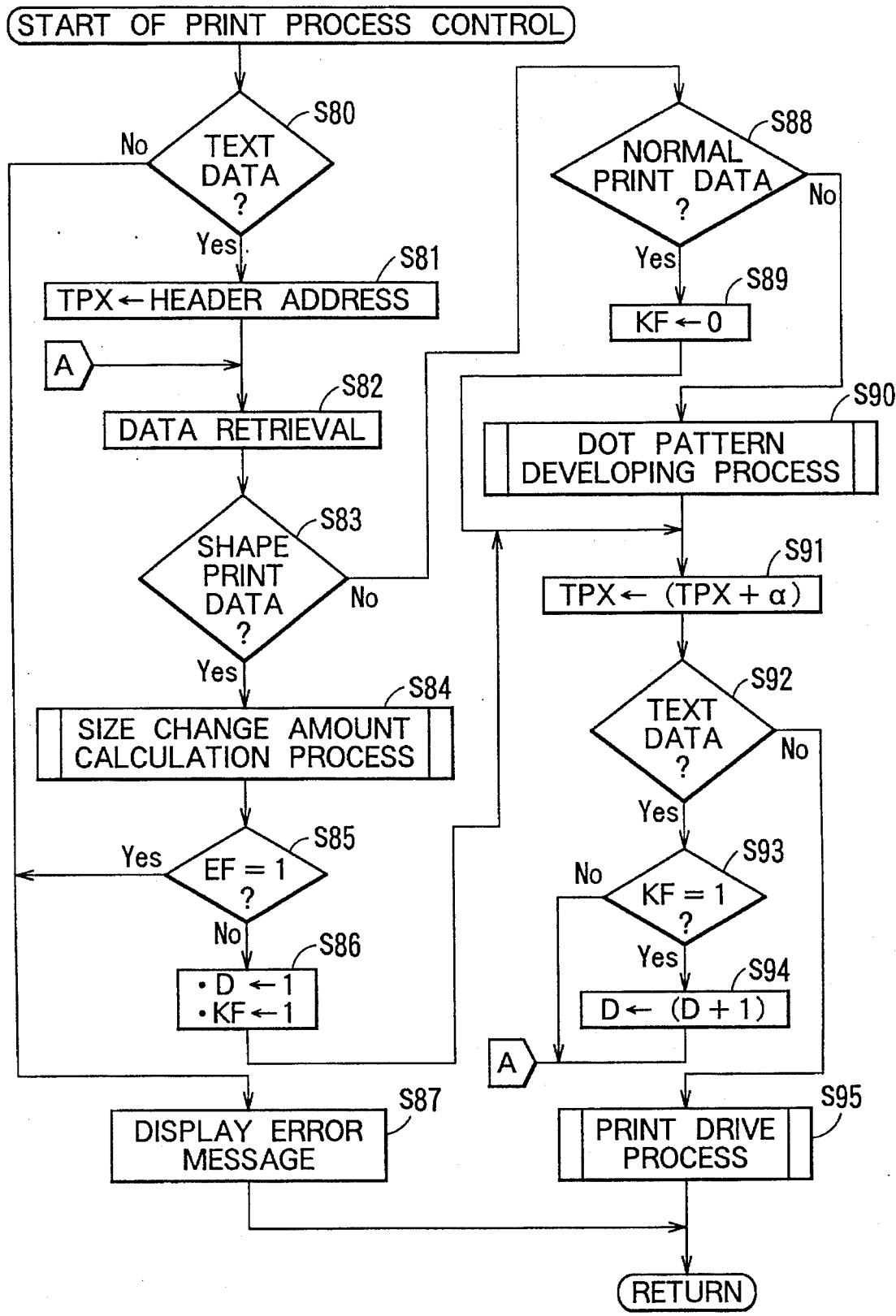
FIG. 11 is a flowchart schematically showing a routine for controlling printing processes.

Next, in the tape print control, when the print key, for causing inputted text to be printed, is manipulated (i.e., step 11 is "YES," step 12, step 16, step 20, and step 22 are "NO," and step 25 is "YES") and when the text mode flag TMF is set (i.e., step 26 is "YES") , print process control shown in FIG. 11 is executed in step 27.

When this control is started, when text data is stored in the text memory 31 (i.e., step 80 is "YES"), the text pointer value TXP is set in the header address of the text memory 31 in step 81. Next, the data indicating the text pointer value TXP is retrieved from the text memory 31 in step 83.

When this data is normal print data (i.e., step 83 is "NO," and step 88 is "YES"), the shape print mode flag KPF is set in step 89. Next, the text pointer value TXP is incremented a predetermined number of bites α in step 91. Based on this the text pointer value TXP, when text data from further developing processes exists in the text memory 31 (i.e., step 92 is "YES") and the shape print mode flag KPF is reset (i.e., step 93 is "NO"), the routine returns to step 82. When the data next retrieved is code data such as characters or symbols (i.e., step 83 and step 88 are "NO"), dot pattern developing process control (refer to FIG. 13) is executed in step 90.

When this control is started, because the shape print mode flag KPF is reset (i.e., step 111 is "NO"), dot pattern data is developed in step 130 based on character size data stored in the print format memory 32 and outline data of the outline data memory 24, normal base line is provided to the print buffer 35 as alignment standard position KP1 in step 126, this control is completed, and the routine returns to step 91. Afterward, step 91 and those steps thereafter are repeatedly executed until all the text data in the text memory 31 has undergone development processes (i.e., step 92 is "NO"), whereupon the dot pattern data developed in the print buffer 35 is outputted to the print mechanism PM in step 95, this control is completed, and the routine returns to step 11.

When the data retrieved based on the text pointer value TXP is shape print data (i.e., step 82 and step 83 are "YES"), a size change amount calculation process control (refer to FIG. 12) is executed in step 84.

When this control is started, first the pattern number data PN stored in the parameter memory 34 is retrieved in step 101 and the change point determination data KD1, the increase/decrease indication data KD2, the alignment position KD3, and the formula number data KD4 indicated by the pattern number data PN are retrieved from the shape designation table KT and stored in the work memory 36 in step 102.

Next, when the change point determination data KD1 is 0 (i.e., step 103 is "YES") and the total number of characters MN in the character string is 2 or more (i.e., step 104 is "YES"), the size change amount ds is determined by the formula shown in step 105 of FIG. 12, and the result is stored in the parameter memory 34 in step 105, the error flag EF is reset in step 106, this control is completed, and the routine returns to step 85.

On the other hand, when the change point determination data KD1 is 1 (i.e., step 103 is "NO") and the total number of characters MN is 3 or more (i.e., step 107 is "YES"), the size change amount ds is determined by the formula shown in step 108 of FIG. 12, and the result is stored in the parameter memory 34 in step 108, the error flag EF is reset in step 106, this control is completed, and the routine returns to step 85.

However, when the change point determination data KD1 is 0, and when the total number of characters MN is not 2 or more (i.e., step 103 is "YES" and step 104 is "NO"), the error flag EF is reset in step 109, and in the same manner the program returns to step 85.

In the print process control, when the error flag EF is not reset (i.e., step 85 is "NO"), the development process character number counter value D is set to 1 and the shape print flag KF is set in step 86, and step 91 and the steps following step 91 are executed.

When the next retrieved data is code data such as characters or symbols (i.e., step 83 and step 88 are "NO"), the dot pattern development process control is executed in step 90.

When this control is started, when the shape print flag KF is set (i.e., step 111 is "YES"), when the header character for this development process is a character or symbol as determined based on the development process control character number count value D (i.e., step 112 is "YES"), and when the increase/decrease indication data KD2 is 0, that is, when character size is to be increased (i.e., step 127 is "YES"), the minimum character size data SS is stored in the parameter memory 34 as print character size data SZ in step 128, and dot pattern data is developed in step 130 based on this minimum character size data SS and outline data.

Next, when the alignment position data D3 is 0 so that the alignment position is the lower edge (i.e., step 120 and step 123 are "NO"), in the same manner as with normally printed characters, the character patterns are arranged in the print buffer 35 with their lower edges aligned in the alignment standard position KP1, which is the baseline, in step 126, this control is completed, and the routine returns to step 91. However, when the alignment position data KD3 is 1 so that characters are to be aligned along the centers of their heights (i.e., step 120 is "YES"), the central position, or half the height, of the developed character pattern data is calculated in step 121, this determined central position is arranged with a predetermined alignment standard position KP2, which is approximately the center height of the print buffer 35, and the characters are positioned in the buffer 35 in step 122. The program then returns to step 91 in the same manner as described previously.

When the alignment position data KD3 is 2 so that the upper edge is the alignment position (i.e., step 120 is "NO," and step 123 is "YES"), the upper edge of the developed character pattern data is calculated in step 124. The character pattern data is arranged in the buffer 35 in step 125 with the upper edge of the character pattern data aligned with a predetermined alignment standard position KP3 that is approximately the upper edge of the height of the print buffer 35. The program then returns to step 91 in the same manner as described previously.

On the other hand, when the character or symbol of this time's development process is not the header character, but is instead the second character or lower based on the development process character number counter value D (i.e., step 113 is "NO"), when the change point determination data KD1 is not 1 (i.e., step 113 is "NO"), and also the increase/decrease designation data KD2 is 0 (i.e., step 115 is "YES"), the print character size data SZ is increased by only the size of the size change amount ds in step 116 and step 119 and those steps following step 119 are executed. When the change point determination data KD1 is not 1 and the increase/decrease designation data KD2 is not 0 (i.e., step 113 and step 115 are "NO"), the print character size data SC is decreased only the size of the size change amount ds in step 118. Then step 119 and those steps following step 119 are executed.

When the change point determination data KD1 is 1 (i.e., step 113 is "YES"), the development process character number count value D is half or less the total character number (i.e., step 114 is "YES"), and the increase/decrease designation data KD2 is 0 (i.e., step 115 is "YES"), step 119 and those steps following step 119 are executed via step 116. However, when change point determination data KD1 is one, even if the development process character number counter value D is half or less the total character number MN, when the increase/decrease designation data KD2 is not 0 (i.e., step 113 and step 114 are "YES" and step 115 is "NO"), step 119 and those steps following step 119 are executed via step 118.

Further, even if the change point determination data KD1 is 1, if the development process character number counter value D is greater than half the total character number MN (i.e., step 113 is "YES" and step 114 is "NO") and the increase/decrease designation data KD2 is 0 (i.e., step 117 is "YES"), step 119 and those steps following step 119 are executed via step 118. However, when the change point determination data KD1 is 1, even if the development process character number counter value D is greater than half the total character number MN, when the increase/decrease designation data KD2 is 0 (i.e., step 113 is "YES" and step 114 and step 117 are "NO"), step 119 and those steps following step 119 are executed via step 116.

In the print process control, step 91 and those steps following step 91 are executed as described previously. When text data to be developed exists in the text memory 31 (i.e., step 92 is "YES") and the shape print mode flag KPF is set (i.e., step 93 is "YES"), the developing process character number count value D is incremented one in step 94 and the program returns to step 82. When all the text data has undergone developing processes (i.e., step 92 is "NO"), the program returns to step 11 via the tape print process in step 95.

When in the tape printing control a key other than a printable key, the cursor movement key, the print mode key, the mode conversion key, or the print key (i.e., step 11 is "YES" and step 12, step 16, step 20, step 22, and step 25 are "NO"), the processes for the operated key are executed in step 28 and the program returns to step 11.

Figure 14:
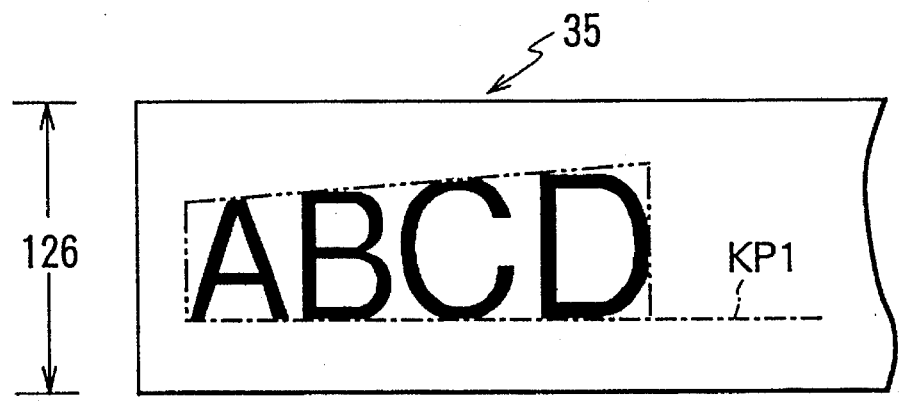
FIG. 14 is a diagram showing data for a character string ABCD developed in a print buffer into a character string shape labeled number pattern number 1.

For example, when the character string ABCD is developed in the print buffer 35 into dot pattern data by pattern number 1 as shown in FIG. 14, first the letter A is positioned in the print buffer 35 with its lower edge portion aligned with the alignment standard position KP1 (baseline) at the smallest character size SS. The print character size SX of each of the characters BCD is enlarged by the size change amount ds in comparison to the previous character and the resultant characters are arranged in order in the print buffer 35 with their lower edges aligned on the alignment standard position KP1.

Figure 15:
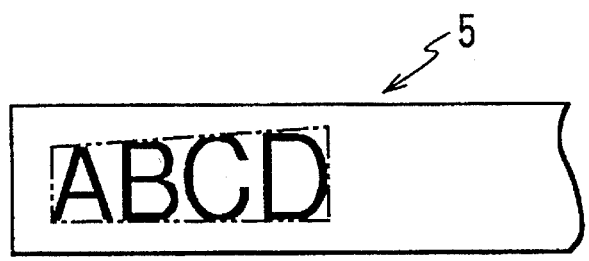
FIG. 15 is a diagram of a character string printed using the dot pattern data shown in FIG. 14.

The character string ABCD is printed on the print tape as shown in FIG. 15 based on the dot pattern data developed in the print buffer 35 in the character string shape of pattern number 1.

Figure 16:
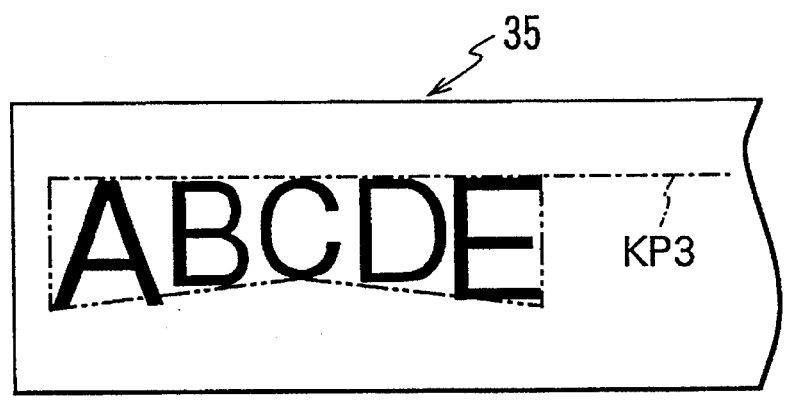
FIG. 16 is a diagram showing data for a character string ABCDE developed in a print buffer into a character string shape labeled number pattern number 4.

In another example, as shown in FIG. 16, the character string ABCD is developed into dot pattern data in the print buffer 35 according pattern number 4 in a similar manner. First the letter A is positioned in the print buffer 35 at the maximum character size LS with the upper edge of the character pattern aligned with the position standard KP3. Then the print character sizes SZ of the characters B and C are decreased the size change amount ds compared to the respective previous character. The characters B and C are then positioned in the print buffer 35 in order with the upper edge of the character pattern aligned with the alignment standard position KP3. Then the print character sizes SZ of the characters D and E are increased only the size change amount ds compared to their respective previous characters. The characters D and E are then positioned in the print buffer 35 in order with the upper edge of each character pattern aligned with the alignment standard position KP3.

Figure 17:
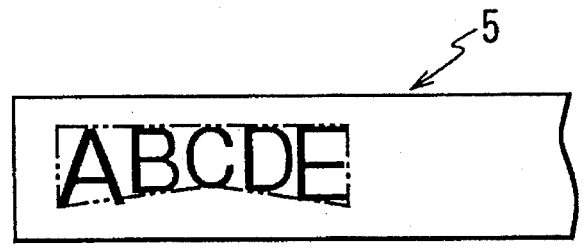
FIG. 17 is a diagram of a character string printed using the dot pattern data shown in FIG. 16.

The character string ABCDE is printed on the print tape 5, as shown in FIG. 17, in the character string shape of the pattern number 4 based on the dot pattern data developed in the print buffer 35.

As described above, a shape standard table KT is provided with a previously set plurality of shape designation data for designating shapes of character strings for each of a plurality of patterns for designating character string shapes of a plurality of character strings of text. Therefore by only inputting text data and setting a pattern number for a character string shape, a minimum character size SS and a maximum character size LS, dot pattern data for character strings of text data is developed so as to form the character string shape corresponding to the set pattern number and printed on a print tape 5. Therefore, character strings of inputted text can be simply and attractively printed in various character string shapes according to the set shape designation data.

Here, an explanation will provided for the relationship between various means described in the claims and the corresponding structure in the preferred embodiment. The set content memory 26 of the ROM 25 corresponds to the shape designation data memory means. The header selection process control, particularly step 61 through step 65, step 66 through step 70, and step 71 through step 75, corresponds to the shape setting means. The size change amount calculation process control corresponds to the determination means. The print process control, particularly step 82 and step 90 through 94, corresponds to the dot pattern data developing means.

Five types of character string shapes, i.e., the pattern numbers 1 through 5, where given in the preferred embodiment. However, printing other character string shapes, such as circles or ellipsoids, or curves lines such as optionally produced illustrations, is also possible. Shape designation data for other shapes can be additionally set in the shape designation table KT. Further, two or more character string shapes can be combined for printing a composite character string shape. The alignment standard positions KP2 and KP3 can be calculated based on the maximum character size LS. Within the technically ideal scope of the present invention, various changes and modifications can be made to the control of the above-described embodiment based on presenting existing technology and technology obvious to a skilled artisan. For example, the present invention can be applied to various text processing devices, such as a Japanese language or English language word processors that include, for example, a keyboard, display, dot-print print mechanism, and the like.

As described above, a text processing device according to claim 1 is provided with a shape designation data memory means, a shape setting means, a size determination means, and a dot pattern data developing means. A character string shape is provided for each of plurality of character strings. A plurality of character designation data for designating each character string shape is previously set. Therefore, by setting only the character string shape, maximum size character, and minimum size character, inputted text data is developed into dot pattern data so as to form the set character string shape and the dot pattern data is printed. Therefore inputted text can be simply and attractively printed in a variety of character string shapes by the shape designation data.

Although the present invention has been described with reference to a specific embodiment, it would be apparent to those skilled in the art that various changes and modification can be made without departing from the scope and spirit of the invention. For example, the text processing device may not have a print mechanism. In such a case, enhanced character string data produced by the text processing device of the invention are printed by a separate printer having a dot pattern developing capability in response to the enhanced character string data. Further, in lieu of setting the maximum and minimum character sizes at the time of selecting an outline contour shape, selectable outline contour shapes may be prepared in advance to have predetermined sizes. In such a case, the size of each character or symbol contained in the character string is determined based on the selected outline contour shapes.

What is claimed is:

1. A text processing device comprising:

input means for inputting text data composed of at least one of symbols and characters;

text data memory means for storing the text data inputted by said input means;

character generator storing data regarding dot patterns of symbols and characters for a selected font;

printing means for printing the symbols and characters;

shape designation data memory means for storing a plurality of pieces of shape designation data, each of the plurality of pieces of shape designation data designating an outline contour shape of a character string;

shape setting means for setting to a character string represented by the text data one of a plurality of outline contour shapes corresponding individually to the plurality of pieces of shape designation data, and for setting a maximum character size and a minimum character size for the character string represented by the text data, set data representative of set outline contour shape, set maximum character size and set minimum character size being output from said shape setting means;

size determination means for retrieving a piece of shape designation data corresponding to the set outline contour shape from said shape designation data memory means based on the set data output from said shape setting means, and for determining a size of each character or symbol making up of the character string represented by the text data, size data representative of the size of each character or symbol thus determined being output from said size determination means; and dot pattern data development means for producing dot pattern data for the each character or symbol making up of the character string represented by the text data based on the size data output form said size determination means and the data stored in said character generator, wherein said printing means performs printing based on the dot pattern data, said shape designation data memory means storing a table identifying the outline contour shape of the character string with a pattern count value, the pattern count value being characterized by a first parameter indicating whether there exists in the character string a change point where increasing character size changes to decreasing character size, a second parameter indicating whether the character size in the character string increases or decreases, a third parameter indicating a line with which the character string is aligned, and a fourth parameter indicating formulas for determining a character size of each character or symbol in the character string.

2. A text processing device according to claim 1, wherein the line indicated by the third parameter includes a first line with which lower points of characters or symbols of the character string are aligned, a second line with which center of height of characters or symbols of the character string are aligned, and a third line with which upper points of characters or symbols of the character string are aligned.

3. A text processing device according to claim 2, wherein the line indicated by the third parameter is a straight line.

4. A text processing device according to claim 1, wherein the formulas determine the size of the character to gradually change a line defining the outline contour shape.

5. A text processing device according to claim 1, wherein said shape setting means comprises a memory storing selectable maximum character sizes and selectable minimum character sizes.

* * * * *